US012682221B2

(12) United States Patent
Tunali et al.

(10) Patent No.: US 12,682,221 B2
(45) Date of Patent: Jul. 14, 2026

(54) TECHNIQUES FOR INCREASING ACTIVATION SPARSITY IN ARTIFICIAL NEURAL NETWORKS

(71) Applicant: Altera Corporation, San Jose, CA (US)

(72) Inventors: Nihat Tunali, San Jose, CA (US); Arnab Raha, San Jose, CA (US); Bogdan Pasca, Toulouse (FR); Martin Langhammer, Salisbury (GB); Michael Wu, Belmont, CA (US); Deepak Mathaikutty, Chandler, AZ (US)

(73) Assignee: Altera Corporation, San Jose, CA (US)

( * ) Notice: Subject to any disclaimer, the term of this patent is extended or adjusted under 35 U.S.C. 154(b) by 716 days.

(21) Appl. No.: 17/953,637

(22) Filed: Sep. 27, 2022

(65) Prior Publication Data

US 2023/0021396 A1 Jan. 26, 2023

(51) Int. Cl.
*G06N 3/048* (2023.01)
*G06N 3/08* (2023.01)
(52) U.S. Cl.
CPC .............. *G06N 3/048* (2023.01); *G06N 3/08* (2013.01)
(58) Field of Classification Search
CPC ........ G06N 3/048; G06N 3/08; G06N 3/0464; G06N 3/0495; G06N 3/063
See application file for complete search history.

(56) References Cited

U.S. PATENT DOCUMENTS

| | | | |
|---|---|---|---|
| 10,841,693 B1 * | 11/2020 | Ganeshkumar | G10L 21/0232 |
| 2006/0222056 A1 * | 10/2006 | Yotsumoto | H04B 1/7073 |
| 2010/0121615 A1 * | 5/2010 | Cunningham | G06F 17/18 |
| 2017/0373910 A1 * | 12/2017 | Shahmohammadian | H04L 27/2688 |
| 2020/0076464 A1 * | 3/2020 | Marr | H04B 1/40 |
| 2021/0150306 A1 * | 5/2021 | Lin | G06N 3/02 |
| 2022/0012012 A1 | 1/2022 | Langhammer et al. | |
| 2022/0108157 A1 * | 4/2022 | Hunter | G06N 3/063 |
| 2022/0113940 A1 | 4/2022 | Langhammer et al. | |
| 2022/0335301 A1 * | 10/2022 | Glafkides | G06N 3/082 |
| 2024/0129468 A1 * | 4/2024 | Hong | H04N 19/85 |

OTHER PUBLICATIONS

Qiu, et al., "FReLU: Flexible rectified linear units for improving convolutional neural networks." (Year: 2018).*
Gulcehre, et al., "Noisy activation functions." (Year: 2016).*
Sabri, et al., "Effect of additive noise for multi-layered perceptron with autoencoders." (Year: 2017).*

* cited by examiner

*Primary Examiner* — Michelle T Bechtold
*Assistant Examiner* — Matiyas T Maru
(74) *Attorney, Agent, or Firm* — Akona IP PC

(57) ABSTRACT

A method for implementing an artificial neural network in a computing system that comprises performing a compute operation using an input activation and a weight to generate an output activation, and modifying the output activation using a noise value to increase activation sparsity.

20 Claims, 14 Drawing Sheets

TECHNIQUES FOR INCREASING ACTIVATION SPARSITY IN ARTIFICIAL NEURAL NETWORKS

FIELD OF THE DISCLOSURE

The present disclosure relates to electronic computer systems, and more particularly, to techniques for increasing activation sparsity in artificial neural networks.

BACKGROUND

As images and videos have become more ubiquitous on the Internet, a need has arisen for algorithms with the capability to efficiently analyze their semantic content for various applications, including search and summarization. Convolutional neural networks (CNNs) have been shown to be effective tools for performing image recognition, detection, and retrieval. CNNs may be scaled up and configured to support large labeled datasets that are required for the learning process. Under these conditions, CNNs have been found to be successful in learning complex and robust image features.

A CNN is a type of feed-forward artificial neural network where individual neurons are tiled in a manner such that they respond to overlapping regions in a visual field. CNNs are inspired by the behavior of optic nerves in living creatures. CNNs process data with multiple layers of neuron connections to achieve high accuracy in image recognition. Developments in multi-layer CNNs have led to improvement in the accuracy of complex recognition tasks such as large-category image classification, automatic speech recognition, as well as other data classification/recognition tasks.

The limitations in computing power of a single processor have led to the exploration of other computing configurations to meet the demands for supporting CNNs. Among the areas of exploration, CNN accelerators that utilize hardware specialization in the form of general purpose computing on graphics processing units (GPGPUs), multi-core processors, field programmable gate arrays (FPGAs), and application specific integrated circuits (ASICs) have been researched.

DETAILED DESCRIPTION

Figure 1:
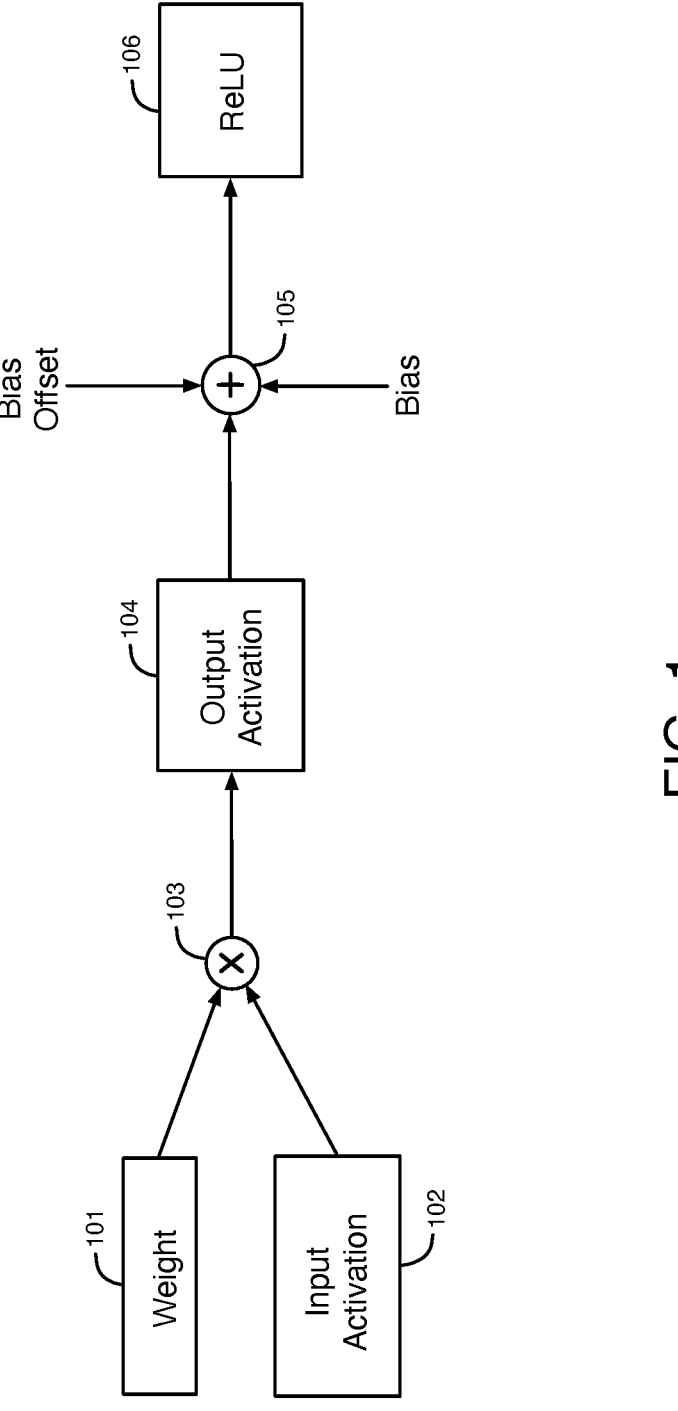
FIG. 1 is a diagram that illustrates examples of operations for a deep artificial neural network that include increasing activation sparsity by applying a negative bias offset to bias-add layers in a batch normalization operation.

Many types of artificial neural networks use activation functions. An activation function transforms a summed weighted input from a node in a neural network into the activation of the node or output for that input. A rectified linear activation function (ReLU) is a piecewise linear function that has been used as an activation function in neural networks. A ReLU outputs the input as the output of the ReLU if the input is positive. A ReLU outputs a zero value directly as the output of the ReLU if the input is negative or zero. The cutoff point of a ReLU is the point at which the output of the ReLU switches between zero and the input.

Artificial intelligence inference methods have been described for increasing the weight sparsity in neural networks to provide increased efficiency, both in the number of computations and in power consumption. Activation sparsity occurs naturally in neural networks that have ReLU functions due to inputs that are less than zero being set to zero by the ReLU function. Activation sparsity can be increased further by moving the cutoff point of a ReLU function to a positive value.

Zero value activations and weights in artificial neural networks can be exploited by machine learning accelerators to reduce the computational complexity of the artificial neural networks by skipping multiply-and-accumulate (MAC) operations at the zero value activations and weights to achieve increased data throughput. Moreover, the compression ratio can be increased by assigning fewer bits to zero value activations and weights. Leveraging activation sparsity in artificial neural networks is more difficult to achieve than increasing the sparsity of weights in artificial neural networks, because of the challenges of activation sparsity changing at runtime of an artificial neural network.

In some previously known research performed to increase activation sparsity in artificial neural networks, the main focus has been to fine-tune or retrain the artificial neural network with L1, or Hoyer, regularization applied to activations. However, there have been several challenges that arise with this process. For example, a customer may not provide the dataset to the machine learning accelerator vendor, software and hardware infrastructure is needed for fine-tuning the artificial neural network, the fine-tuning can be time consuming even if software and hardware infrastructure exists, prior studies have used 20-90 epochs of fine-tuning, and hyperparameter tuning is often required.

According to some examples disclosed herein, techniques are provided for applying a negative bias offset to bias-add or batch-normalization layers in an artificial neural network (ANN) that precede rectified linear activation function (ReLU) layer in the ANN to increase the sparsity of activations. The probability density function (PDF) of activations can be actively shaped between the layers of an ANN. In some examples, a scaling function is also added before the ReLU layer, after the negative bias offset is applied to the bias-add or batch-normalization layers. According to other examples, a noise function can be added before the ReLU layer, e.g., after the shaping or to the bias offset value directly. Examples disclosed herein include a number of different noise functions. Even in the most complex version, the noise functions can be synthesized by the summation of multiple simple noise sources. The techniques disclosed herein can provide a substantial increase in efficiency and/or a reduction in power consumption of an ANN using, for example, a small number of logic gates.

Figure (FIG. 1 is a diagram that illustrates examples of operations for a deep artificial neural network (ANN) that include increasing activation sparsity by applying a negative bias offset to bias-add or batch normalization layers. The operations shown in FIG. 1 can be part of layers of an ANN. The ANN can be, for example, a deep ANN having several layers. The portion of the artificial neural network (ANN) shown in FIG. 1 includes a weight 101, an input activation 102, a compute operation 103 (e.g., a two-dimensional or three-dimensional convolution operation), a bias offset operation 105, and a ReLU 106. The input activation 102 can be, e.g., an input tensor received from a previous layer of the ANN. The compute operation 103 generates an output activation 104 by performing a computation (e.g., convolution) using the weight 101 and the input activation 102. The output activation 104 can be, for example, an output tensor. A bias offset operation 105 then adds a bias value and a bias offset value to the output activation 104. The bias offset value is a negative value (i.e., less than zero). The bias offset operation 105 increases the activation sparsity in the ANN by adding the negative bias offset value to the bias value and the output activation 104 to modify the probability density function of activations provided as an input to ReLU 106.

The ReLU operation 106 then performs rectified linear activation on the activations received from operation 105 to generate output activations. For each value of the activations received from operation 105, ReLU operation 106 provides the value as the output of ReLU operation 106 if the value is positive, and ReLU operation 106 provides a zero value directly as the output of ReLU operation 106 if the value is negative or zero. The negative bias offset value added to the sum in operation 105 increases activation sparsity in the output of ReLU operation 106. The output of ReLU operation 106 can, for example, be applied to additional layers of the ANN or as an output of the ANN.

Machine learning accelerators often fold the multiplicative component of the operation 105 into the weights and the additive component into bias add. Therefore, FIG. 1 captures the bias-add and/or batch-normalization layers. In the example of FIG. 1, a negative bias offset value is applied to the bias add layers in operation 105. Because the bias add layers precede the layers that include ReLU operation 106, the negative bias offset value that is added to the bias add layer in operation 105 results in more activations that are equal to zero after the ReLU operation 106.

Figure 2A:
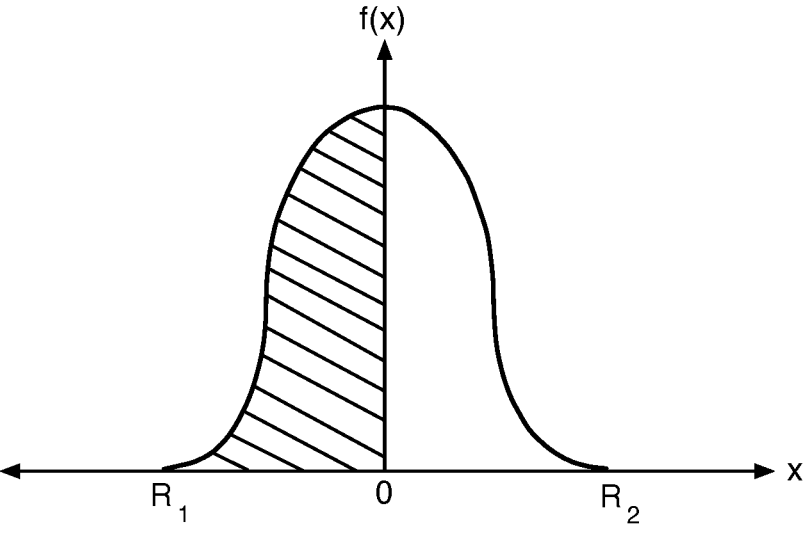
FIG. 2A is a graph that depicts the effect of adding a zero bias offset to the bias-add layers in a batch normalization operation on the probability density function (PDF) of the activations.

FIG. 2A is a graph that depicts the effect of adding a zero bias offset value T (where T=0) to the bias-add layers in operation 105 on the probability density function (PDF) of the activations before the layer that includes ReLU operation 106. The function f(x) shown in FIG. 2A is an example of the output of operation 105 using a zero bias offset T and using examples of values/tensors for the weight 101, the input activation 102, and the bias value. $R_1$ and $R_2$ represent the lower and upper values of the function f(x), respectively.

Figure 2B:
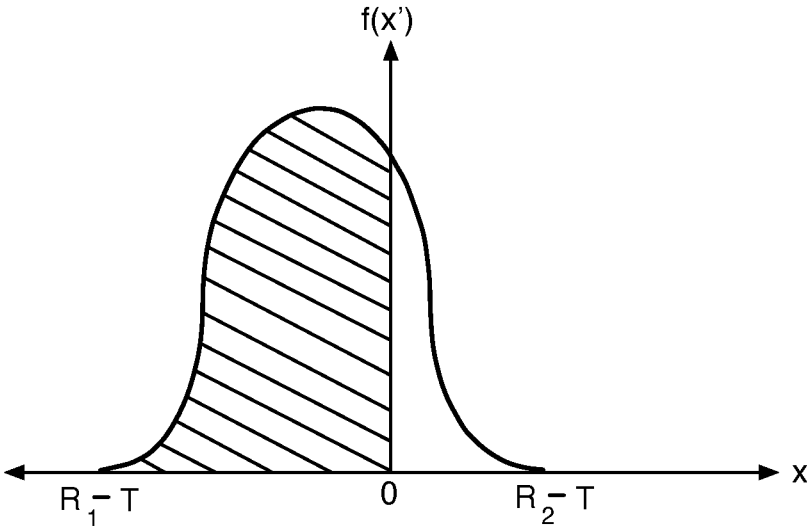
FIG. 2B is a graph that depicts the effect of adding a negative bias offset to the bias-add layers in the batch normalization operation on the probability density function (PDF) of the activations.

FIG. 2B is a graph that depicts the effect of adding a negative bias offset value −T (i.e., −T<0) to the bias-add layers in operation 105 on the probability density function (PDF) of the activations before the layer that includes ReLU operation 106. The function f(x') shown in FIG. 2B is an example of the output of operation 105 using examples of values/tensors for the weight 101, the input activation 102, the bias value, and the negative bias offset value. After adding a negative bias offset value to the bias add layers in operation 105, the original PDF is shifted to the left as shown in FIG. 2B compared to FIG. 2A, causing the ratio of activations equal to zero after the ReLU operation 106 to increase. Thus, the negative bias offset value increases activation sparsity in the ReLU operation 106.

Adding a negative bias offset value in operation 105 may introduce a perturbation into the neural network, which may increase accuracy loss in the output of the neural network. The accuracy loss can be mitigated with and without fine-tuning the neural network. According to an example that can be used to mitigate accuracy loss without fine tuning or re-training a neural network, a single layer in the neural network can be selected according to one or more heuristics. The heuristics can include (1) the layer originally has a small amount of activation sparsity, (2) the layer has a large activation memory footprint, (3) activation sparsity that is introduced into the layer propagates to other layers of the neural network, and/or (4) less accuracy loss is introduced into the layer compared to other layers in the neural network.

The techniques of activation sparsity that are disclosed herein can be applied to any artificial neural network (ANN) that includes, for example, a rectified linear activation function (ReLU). As specific examples that are not intended to be limiting, the techniques of activation sparsity disclosed herein can be applied convolutional neural networks (CNNs) having different topologies. A negative bias offset value can be applied in operation 105 in a carefully selected convolutional layer. With the appropriate selection of negative bias offset values and convolutional layers, a significant increase in activation sparsity can be achieved at the expense of a small loss in accuracy for several CNN topologies.

According to other examples that can be used to mitigate accuracy loss caused by activation sparsity in a neural network, some of the lost accuracy can be recovered by fine-tuning or re-training the neural network. According to these examples, the same bias offset values can be applied to all of the outputs of the convolutional layers of a CNN, the bias add values and batch-normalization values can be set to be untrainable, and the convolutional layer weights and fully connected layer weights of the CNN are set to be trainable. The CNN can then be fine-tuned for a few epochs. With the appropriate selection of bias offset values and fine-tuning for CNNs for a few epochs, further increase in activation sparsity can be achieved with negligible loss in accuracy.

According to an additional example for increasing activation sparsity in an artificial neural network (ANN), activations in the ANN are scaled by a scalar value after application of a negative bias offset value to bias-add or batch-normalization layers in the ANN. The scalar value can be selected, for example, to be a scalar value between 0 and 1. By selecting a scalar value between 0 and 1, the variance of the activations can be decreased, which further increases the ratio of activations that are zero after the ReLU operation.

Figure 3:
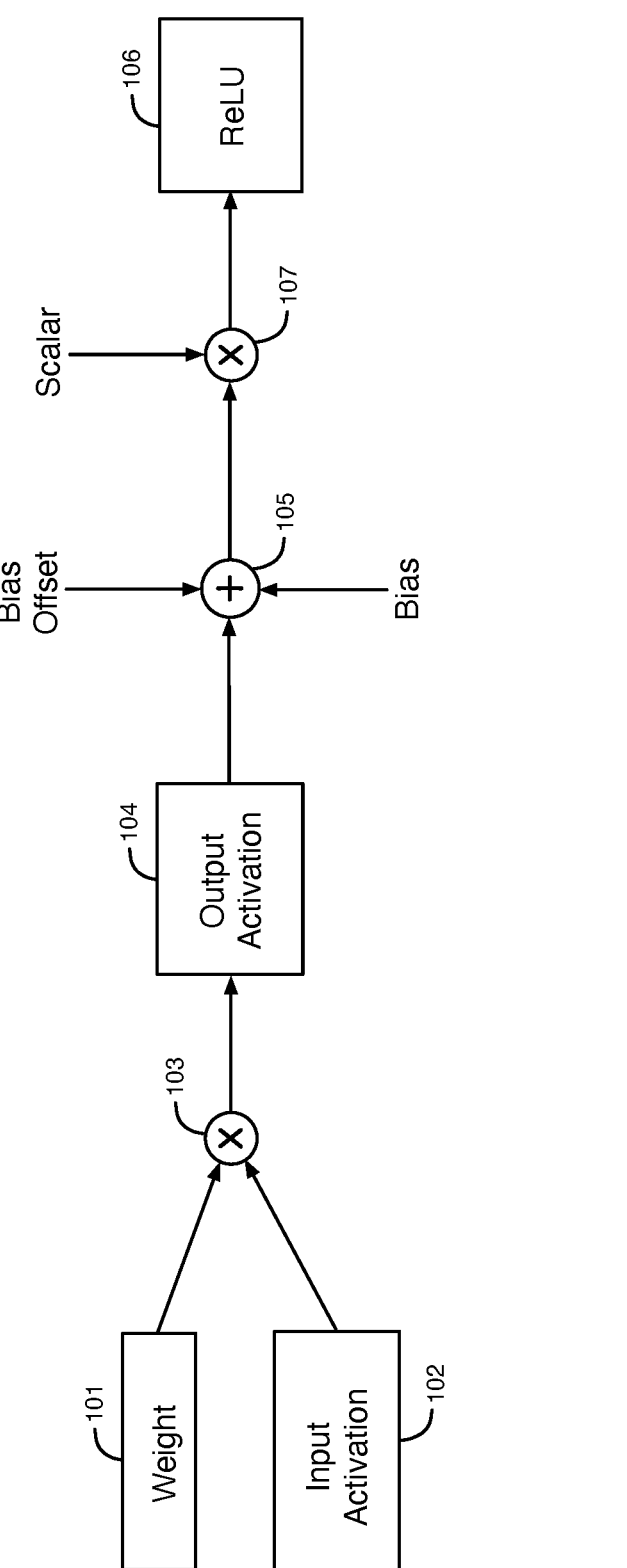
FIG. 3 is a diagram that illustrates examples of operations for an artificial neural network (ANN) that include applying a scalar value after application of a negative bias offset to bias-add layers.

FIG. 3 is a diagram that illustrates examples of operations for an artificial neural network (ANN) that include applying a scalar value after application of a negative bias offset value to bias-add or batch-normalization layers. The operations shown in FIG. 3 can be part of one or more layers of an ANN. The ANN can be, for example, a deep ANN having several layers. The portion of the ANN shown in FIG. 3 includes a weight 101, an input activation (e.g., an input tensor from a previous layer of the ANN), a compute operation 103 (e.g., a two-dimensional or three-dimensional convolution operation), operation 105, a multiplication operation 107, and ReLU operation 106. As described above with respect to FIG. 1, compute operation 103 generates an output activation 104 (e.g., an output tensor) by performing a computation (e.g., convolution) using the weight 101 and the input activation 102 (e.g., input tensor). The operation 105 then increases activation sparsity by adding a bias value and a negative bias offset value to the output activation 104 to generate activations that are provided to multiplication operation 107.

The activations are generated in operation 105 by summing the bias value, the negative bias offset value, and the output activation 104. Multiplication operation 107 then multiplies a scalar value (e.g., between 0 and 1) by the activations generated by operation 105. The scaled activations generated in operation 107 are provided as an input to ReLU operation 106. ReLU operation 106 then performs rectified linear activation on the scaled activations generated by operation 107 to generate a rectified output function having increased activation sparsity as a result of the negative bias offset value applied in operation 105 and the scalar value applied in operation 107. For each value of the activations received from operation 107, ReLU operation 106 provides the value as the output of ReLU operation 106 if the value is positive, and ReLU operation 106 provides a zero directly as the output of ReLU operation 106 if the value is negative or zero. The rectified output function of ReLU operation 106 can, for example, be applied to additional layers of the ANN or as an output of the ANN.

Figure 4:
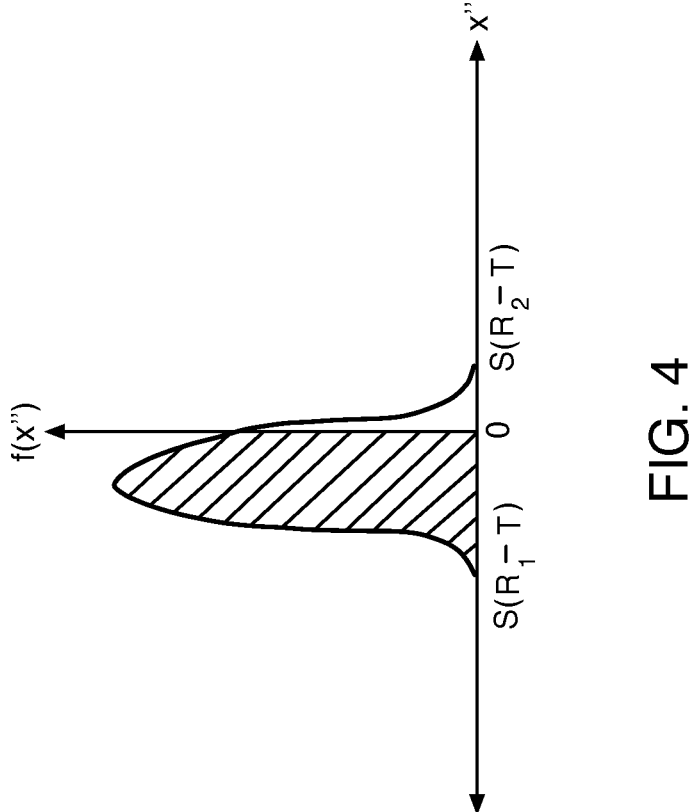
FIG. 4 is a graph that depicts the effect of multiplying a scalar value in a multiplication operation on the probability density function (PDF) of the activations in the example of FIG. 3.

FIG. 4 is a graph that depicts the effect of multiplying a scalar value in multiplication operation 107 on the probability density function (PDF) of the activations in the example of FIG. 3. The graph of FIG. 4 is generated by adding a negative bias offset value of $-T$ in operation 105 and by multiplying a scalar value S that is between 0 and 1 in operation 107. The probability density function $f(x'')$ of scaled activations is depicted in FIG. 4. The scaled activations are generated at the output of operation 107 by multiplying the scalar value S by the activations generated by operation 105 and shown in FIG. 2B. By using a scalar value S between 0 and 1, the variance of activations can be decreased, which further increases the ratio of activations that are zero after the ReLU operation 106. The negative bias offset value $-T$ added in operation 105 and the scalar value S multiplied in operation 107 effectively change the ReLU operation 106 from $\max(0,x) \rightarrow \max(0, S \times (x-T))$, where $0 < S < 1$ and $T > 0$.

Figure 5:
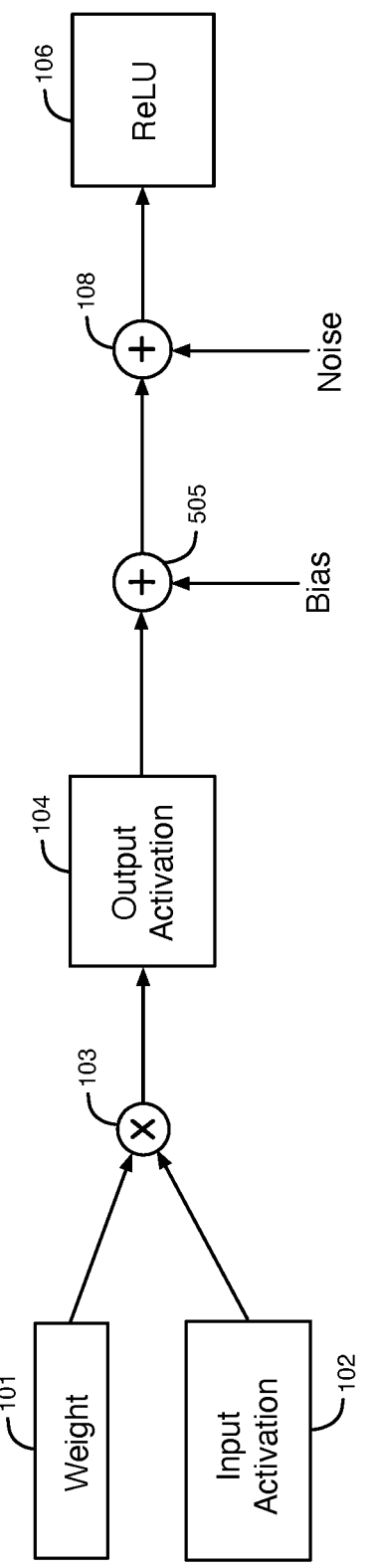
FIG. 5 is a diagram that illustrates examples of operations for an artificial neural network (ANN) that include adding a noise value or noise tensor before a rectified linear activation operation.

According to another example, a noise value or noise tensor is added into the operations of an ANN before the ReLU operation. The noise tensor may, for example, be independent from the activation tensor and may, for example, have the same dimensions of the activation tensor. FIG. 5 is a diagram that illustrates examples of operations for an artificial neural network (ANN) that include adding a noise value or noise tensor before a ReLU operation to increase activation sparsity. The operations shown in FIG. 5 can be part of one or more layers of an ANN, such as a deep ANN. The portion of the ANN shown in FIG. 5 includes weight 101, input activation 102 (e.g., an input tensor), operation 103, output activation 104 (e.g., an output tensor), operation 505, operation 108, and ReLU operation 106. The operation 103 functions as described above with respect to the examples of FIGS. 1 and 3. In operation 505, the output activation 104 is added to a bias value to generate activations that are provided to operation 108. In operation 108, the activations generated by operation 505 are added to a noise value or noise tensor. The activations generated by operation 108 are provided to ReLU operation 106. ReLU operation 106 then performs rectified linear activation on the activations generated by operation 108 to generate a rectified output function having increased activation sparsity as a result of the noise added in operation 108. For each value of the activations generated by operation 108, ReLU operation 106 provides the value as the output of ReLU operation 106 if the value is positive, and ReLU operation 106 provides a zero directly as the output of ReLU operation 106 if the value is negative or zero.

Figure 6A:
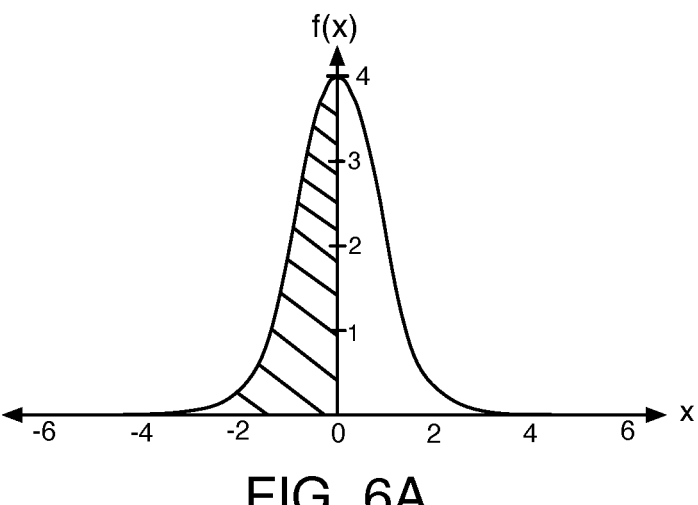
FIGS. 6A-6C are graphs that illustrate the resultant probability distributions and the increase in activation sparsity using a noise tensor as in the example of FIG. 5.
Figure 6B:
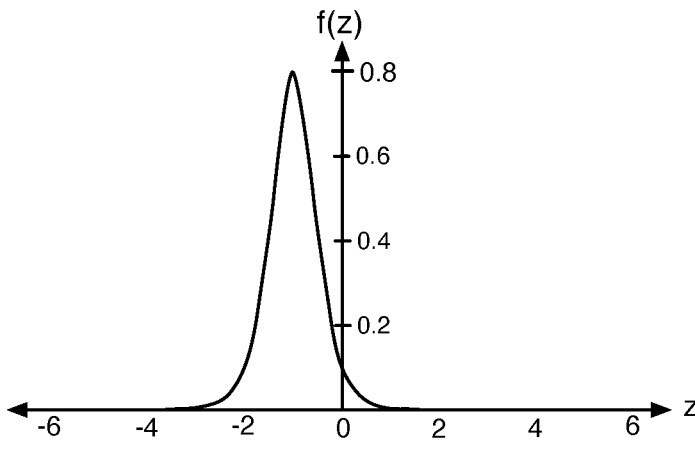
Figure 6C:
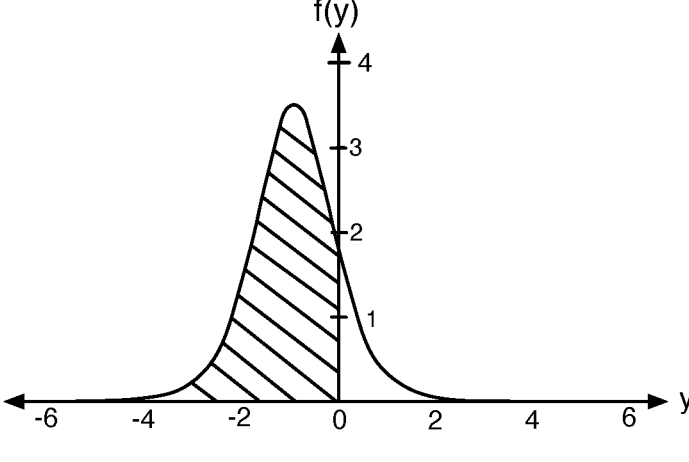

FIGS. 6A-6C are graphs that illustrate the resultant probability density functions and the increase in activation sparsity caused by adding a noise tensor as in the example of FIG. 5. The graphs shown in FIGS. 6A and 6C depict the probability density functions $f(x)$, $f(y)$ of the activations x and y generated by operations 505 and 108, respectively, using exemplary values/tensors for weight 101, input activation 102, the bias value, and the noise tensor in the example of FIG. 5. FIG. 6B depicts the probability density function $f(z)$ of the noise tensor z, which is an operand of operation 108 of FIG. 5.

The noise tensor can be constrained to have a probability density function such that upon adding the noise tensor to the activation tensor in operation 108, the resultant probability density function is more heavily concentrated on the negative x-axis, which increases the ratio of activations that are zero after the ReLU operation 106. According to a specific example that is not intended to be limiting, the original activation probability distribution prior to ReLU operation 106 can be a zero-mean unit variance Gaussian distribution, i.e. $x \sim N(0,1)$. In this example, because $P(x \leq 0) = 0.5$, 50% of the activations after the ReLU operation 106 are zero. If a noise tensor n is added with a mean of $-1$ and variance of 0.25, i.e. $n \sim N(-1, 0.25)$, the resultant tensor $y = x + n$ then has the following Gaussian distribution $y \sim N(-1, 1.25)$, because (1) the sum of independent Gaussian random variables have a Gaussian distribution, (2) the mean of a sum of random variables is equal to the summation of the means, and (3) the variance of a sum of independent random variables is equal to the summation of the variances. Because $y \sim N(-1, 1.25)$, $P(y \leq 0) = 0.81$ in this example, which implies that 81% of the activations after the ReLU operation 106 are zero. In summary, adding the noise tensor n in operation 108 resulted in increasing the sparsity of activations from 50% to 81% for this example.

Figure 7:
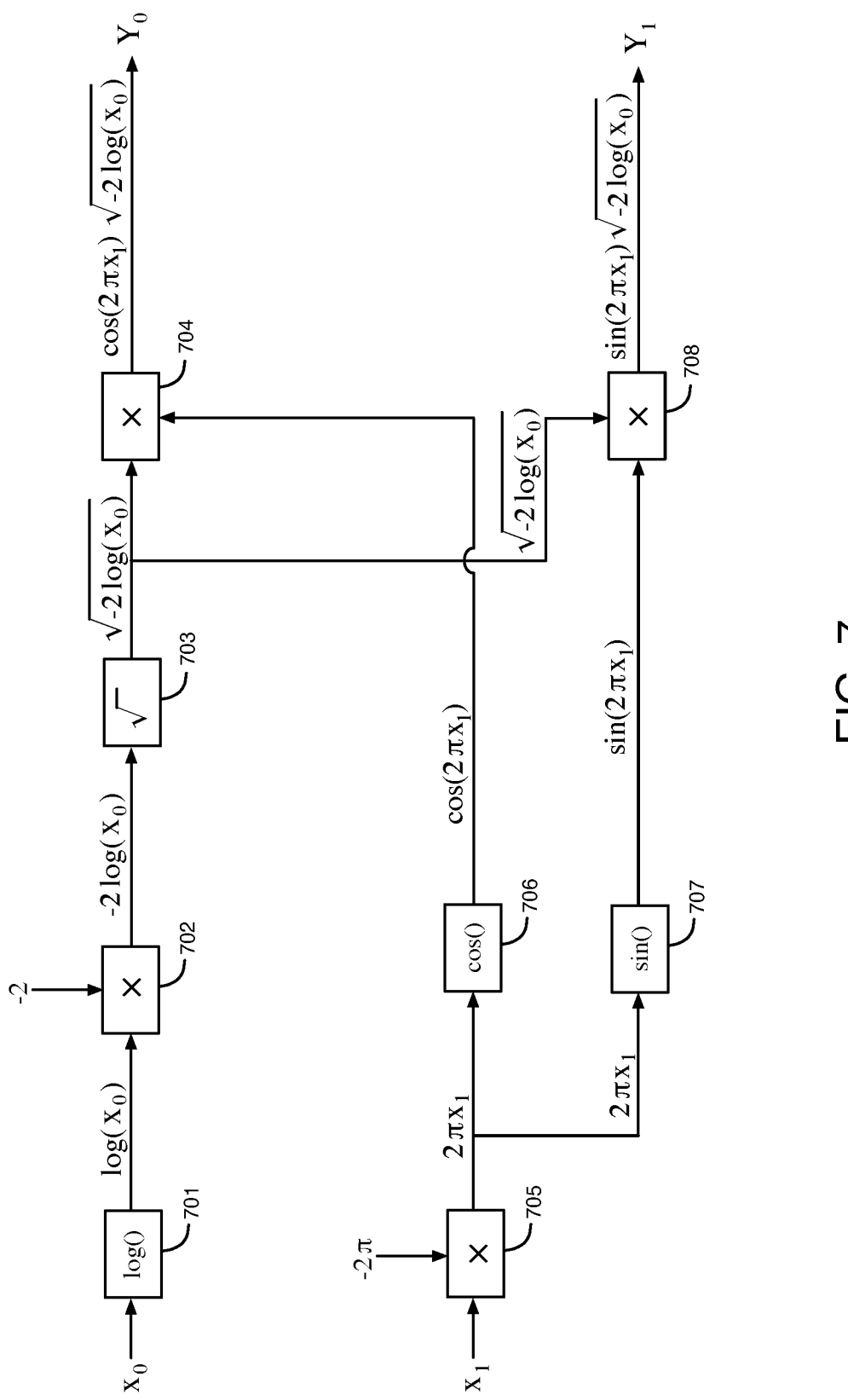
FIG. 7 is a diagram that illustrates examples of the operations of the Box-Muller transform.
Figure 8:
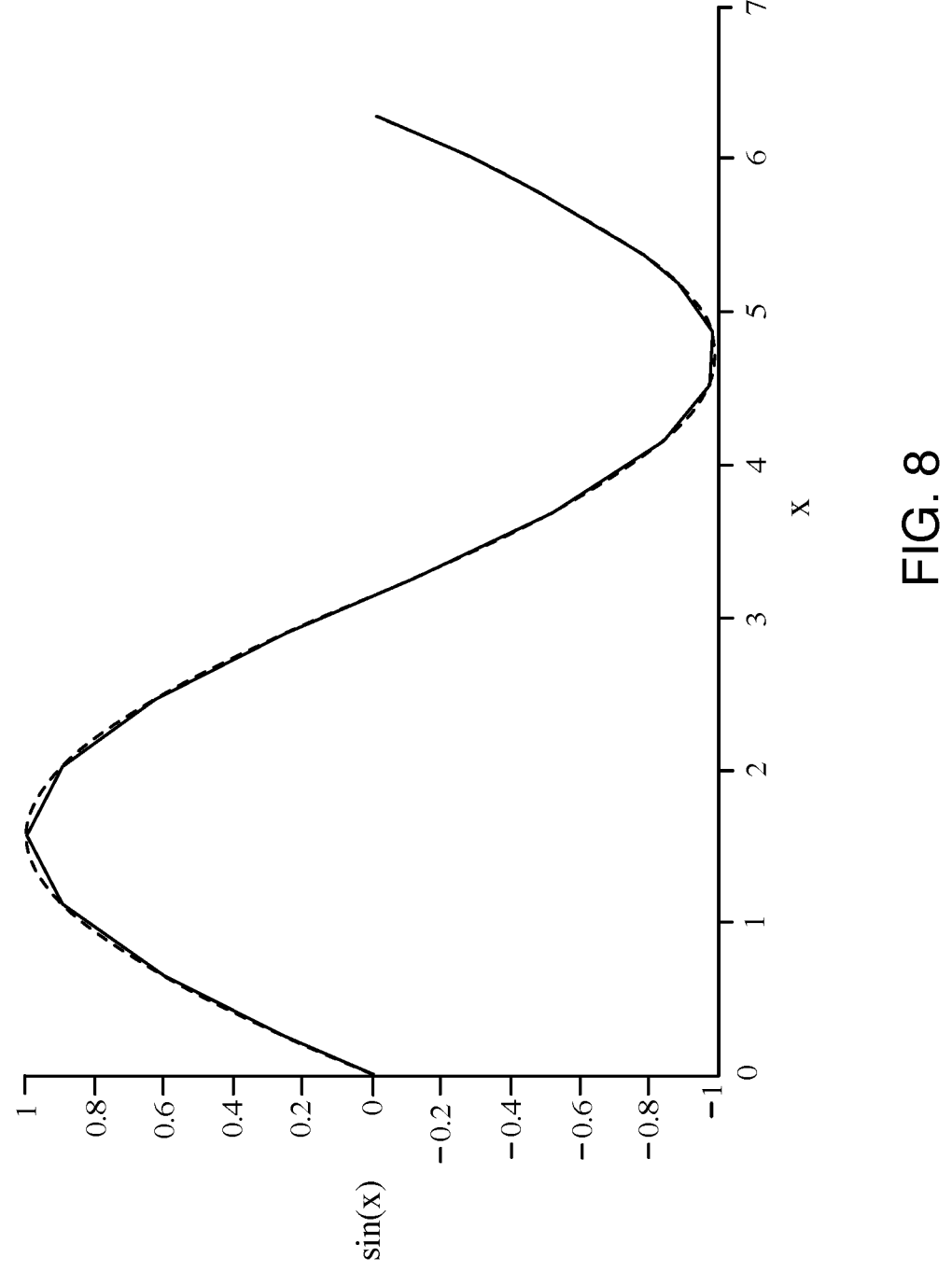
FIG. 8 is a graph that illustrates an example of the Box-Muller transform approximated as piecewise linear functions on a field programmable gate array (FPGA).

The noise tensor n added in operation 108 prior to the ReLU operation 106 effectively changes the ReLU operation 106 from max(0, x)→max (0, x+n). The noise tensor added in operation 108 can also be generated at runtime. Also, the mean and variance of the noise tensor can be set to be trainable parameters that are incorporated as part of a retraining flow. For example, the Box-Muller transform can be utilized to generate a Gaussian random variable for the noise tensor. The Box-Muller transform can be summarized as follows. Suppose $X_0$ and $X_1$ are uniformly distributed random numbers within the interval (0,1). If variables $Y_0$, $Y_1$ are defined as $Y_0=\sqrt{-2\log X_0}\times\cos(2\pi X_1)$, $Y_1=\sqrt{-2\log X_0}\times\sin(2\pi X_1)$, respectively, $Y_0$ and $Y_1$ would be independent and identically distributed Gaussian random variables with zero mean and unit variance. The Box-Muller transform requires the computation of square root, logarithm, sine, and cosine operations in addition to two uniformly distributed random variables and the multiplications of these terms, which can be costly to implement in hardware. FIG. 7 is a diagram that illustrates examples of the logarithm operation 701, the multiplication operation 702, the square root operation 703, the multiplication operations 704 and 705, the cosine operation 706, the sine operation 707, and the multiplication operation 708 of the Box-Muller transform. FIG. 8 is a graph that illustrates an example of the Box-Muller transform approximated as piecewise linear functions of sin(x) on a field programmable gate array (FPGA).

Figure 9:
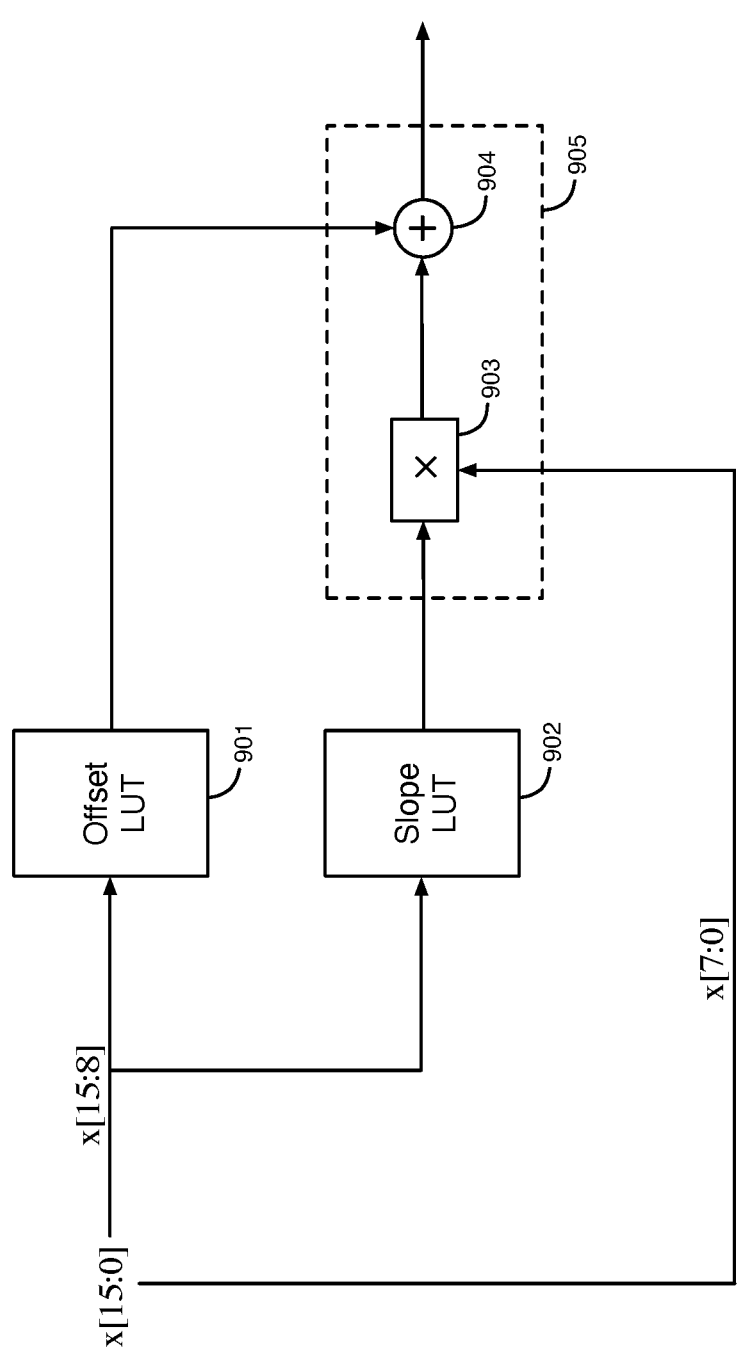
FIG. 9 is a diagram of a piecewise linear function that is implemented by two lookup tables (LUTs), a multiplication operation, and an addition operation.

FIG. 9 is a diagram of a piecewise linear function that is implemented by two lookup tables (LUTs) 901 and 902, a multiplication operation 903, and an addition operation 904. According to a specific example of FIG. 9, the piecewise linear function with 64 intervals on 16 bit inputs (i.e., x[15:0]) can be implemented by using 2 memory logic array block (MLABs) to perform the functions of the lookup tables 901-902 and a digital signal processing (DSP) block 905 to perform the multiply and add operations. As shown in FIG. 9, the most significant 8 bits (i.e., x[15:8]) of the input are used to index to an offset lookup table 901 and a slope lookup table 902 constructed from MLABs. The least significant 8 bits (i.e., x[7:0]) of the input are multiplied by the slope value extracted from the slope lookup table 902 in multiplication operation 903. The product of the multiplication operation 903 is added to the offset value extracted from the offset lookup table 901 in addition operation 904.

Implementing the Box-Muller transform can be challenging even with piecewise linear approximations. An alternative method to generate the noise tensor used in operation 108 of FIG. 5 can approximated by leveraging the central limit theorem. The central limit theorem is defined by equation (1) below in which $X_1$, $X_2$, . . . is a sequence of independent and identically distributed random variables with common mean $\mu$ and variance $\sigma^2$.

$$Z_n = \frac{X_1 + \ldots + X_n - n\mu}{\sigma\sqrt{n}} \quad (1)$$

Figure 10:
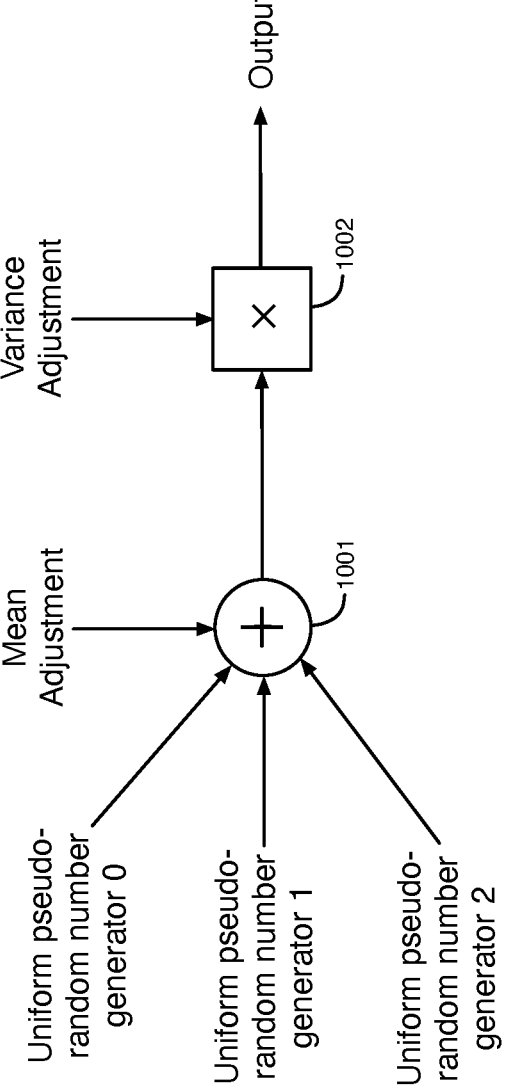
FIG. 10 is a diagram of an example of an addition operation and a multiplication operation that can generate an approximate Gaussian distribution function.

Then, the cumulative distribution function (CDF) of $Z_n$ converges to a Gaussian CDF with zero mean and unit variance as n→∞. In practice, summing as few as three independent uniformly distributed pseudo-random variables with zero mean and unit-variance can approximate a Gaussian distribution. The approximate Gaussian distribution can have a desired mean and variance by scaling and shifting. FIG. 10 is a diagram of an example of an addition operation 1001 and a multiplication operation 1002 that can generate an approximate Gaussian distribution function using equation (1). Addition operation 1001 adds a mean adjustment $-n\mu$ and three pseudo-random numbers generated by three uniform pseudo-random number generators (0, 1, 2) to generate a sum. Multiplication operation 1002 multiplies the sum of addition operation 1001 with a variance adjustment $1/\sigma\sqrt{n}$ to generate an output that represents an approximate Gaussian distribution function.

In order to generate uniformly distributed pseudo-random numbers, maximum-length linear feedback shift registers (LFSR) can be used. A maximum-length LFSR is a shift register where the most significant bit (MSB) of the LFSR is a linear function, which is defined as a primitive polynomial, of a subset of the bits in a previous state of the LFSR.

Figure 11:
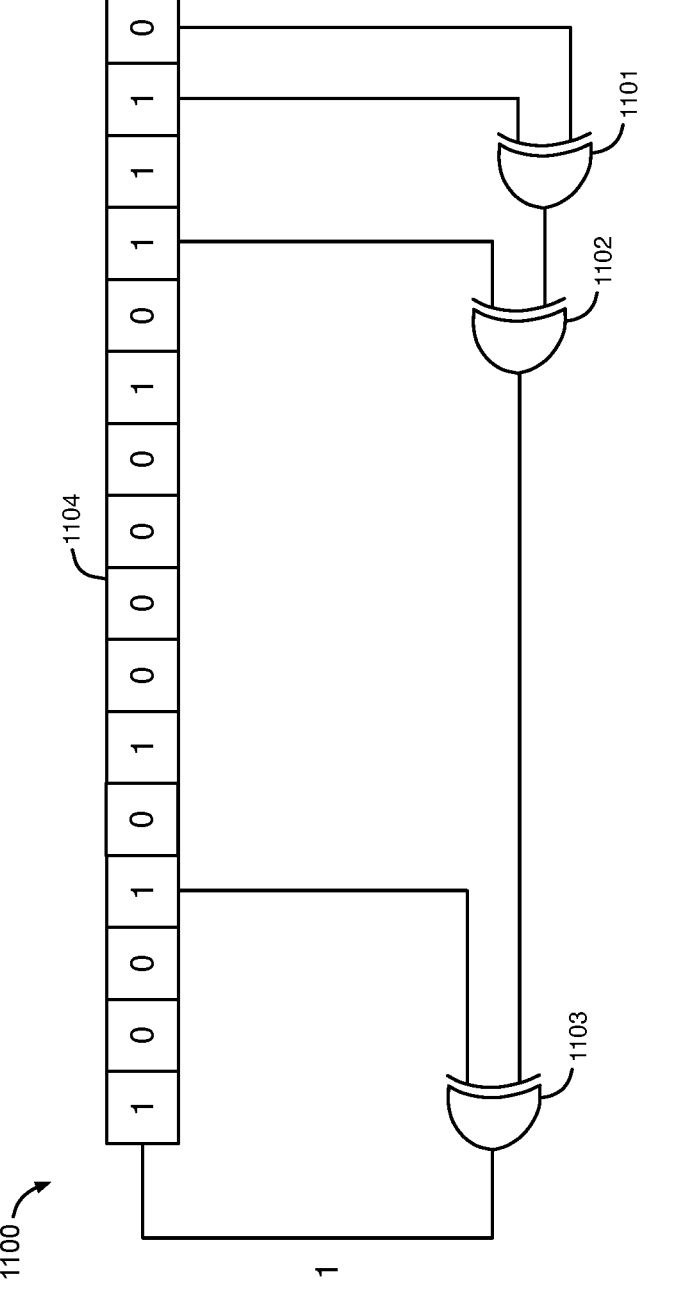
FIG. 11 is a diagram that depicts an example of a linear feedback shift register (LFSR) that generates 16-bit uniformly distributed pseudo-random numbers.

FIG. 11 is a diagram that depicts an example of a linear feedback shift register (LFSR) 1100 that generates 16-bit uniformly distributed pseudo-random numbers. LFSR 1100 includes 3 exclusive OR (XOR) gates 1101-1103 and a 16-bit shift register 1104. XOR gate 1101 performs an XOR function on the 2 least significant bits (LSBs) stored in shift register 1104. XOR gate 1102 performs an XOR function on the output bit of XOR gate 1101 and the fourth least significant bit (LSB) stored in shift register 1104. XOR 1103 performs an XOR function on the output bit of XOR gate 1102 and the fourth most significant bit (MSB) stored in shift register 1104. In each cycle, the output bit of XOR gate 1103 is stored as the MSB in shift register 1104, and the remaining bits stored in shift register 1104 are shifted from left to right by 1 bit.

The primitive feedback polynomial of LFSR 1100 is $X^{16}+X^{15}+X^{13}+X^4+1$, where bit 16 is the LSB and bit 1 is the MSB. FIG. 11 shows examples of the 16 bits stored in shift register 1104. Using the bits stored in shift register 1104 shown in FIG. 11, the output of the primitive polynomial (i.e., the output of XOR gate 1103) based on the current state of LFSR 1100 is 1. In the subsequent cycle, the sixteen bits stored in shift register 1104 are shifted from left to right by one bit position, and the MSB stored in shift register 1104 is set to the output of the XOR gate 1103 in the current cycle, which is the XOR of the $4^{th}$, $13^{th}$, $15^{th}$, and $16^{th}$ bits stored in shift register 1104. The output of this XOR operation is equal to 1 using the bits shown in shift register 1104 in FIG. 11.

Figure 12:
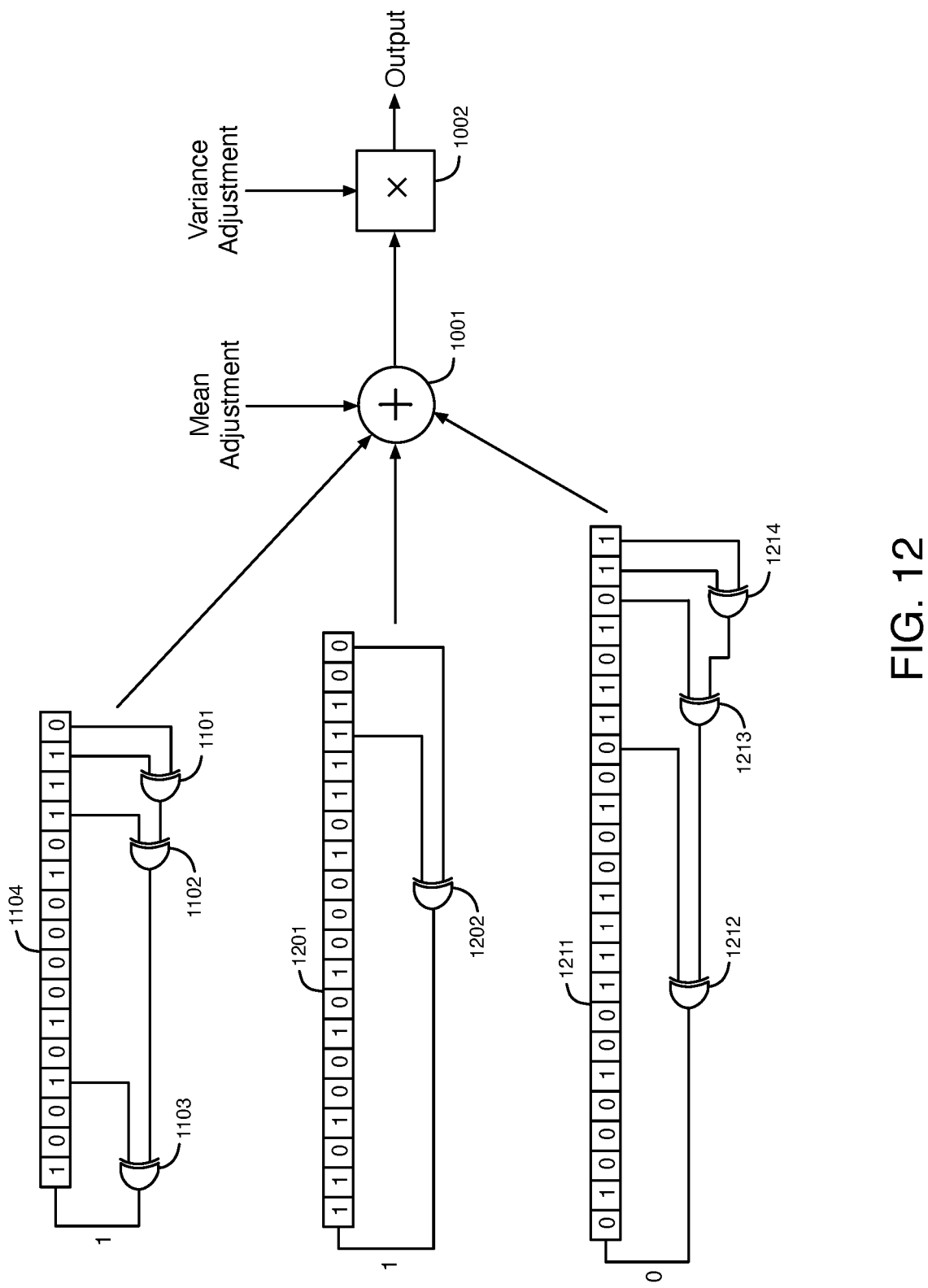
FIG. 12 is a diagram that depicts an example of the operations of FIG. 10 receiving three pseudo-random numbers as inputs from three linear feedback shift registers (LFSRs).

In order to implement the generation of three independent uniformly distributed pseudo-random variables as shown in FIG. 10, three LFSRs with different polynomials, different initial states, and different number of output bits can be used. FIG. 12 is a diagram that depicts an example of the operations of FIG. 10 receiving three pseudo-random numbers as inputs from three linear feedback shift registers (LFSRs). The first LFSR of FIG. 12 is the 16-bit LSFR 1100 of FIG. 11 that includes shift register 1104 and XOR gates 1101-1103. The second LFSR of FIG. 12 includes a 20-bit shift register 1201 and an XOR gate 1202. XOR gate 1202 performs an XOR function on the first and the fourth least significant bits (LSBs) stored in shift register 1202 (i.e., bits 17 and 20). In each cycle, the output bit of XOR gate 1202 is stored as the MSB in shift register 1201, and the remaining bits stored in shift register 1201 are shifted from left to right by 1 bit.

The third LFSR of FIG. 12 includes a 24-bit shift register 1211 and three XOR gates 1212-1214. XOR gate 1214 performs an XOR function on the 2 least significant bits (LSBs) (i.e., bits 23-24) stored in shift register 1211. XOR gate 1213 performs an XOR function on the output bit of XOR gate 1214 and the third least significant bit (i.e., bit 22) stored in shift register 1211. XOR 1212 performs an XOR function on the output bit of XOR gate 1213 and the eighth least significant bit (i.e., bit 17) stored in shift register 1211. In each cycle, the output bit of XOR gate 1212 is stored as the MSB in shift register 1211, and the remaining bits stored in shift register 1211 are shifted from left to right by 1 bit.

The three linear feedback shift registers (LFSRs) shown in FIG. 12 generate three pseudo-random numbers stored in shift registers 1104, 1201, and 1211. The three pseudo-random numbers generated by the LFSRs are provided as inputs to addition operation 1001. Addition operation 1001 adds a mean adjustment and the three pseudo-random numbers generated by the three LFSRs to generate a sum. Multiplication operation 1002 multiplies the sum of addition operation 1001 with a variance adjustment to generate an output that represents an approximate Gaussian distribution function.

The load, compute, and drain pipelines in a typical sparse deep neural network (DNN) accelerator are now described. A DNN accelerator usually contains an array of processing elements (PEs). For some DNN accelerators, the processing elements (PEs) are arranged in another level of hierarchy, such as a column of PEs. A processing element (PE) array or grid, which forms the core of the DNN accelerator, is constructed by grouping a number of these columns. Hierarchical partitioning allows the DNN accelerator to work at a higher frequency of operation, because the data distribution and output retrieval are distributed. Further, hierarchical partitioning makes the DNN accelerator highly scalable, because arrays of various sizes can be built. In addition to the PE array, the other main components of the DNN accelerator are the load and drain units. The load unit is responsible for reading and sending data from higher levels of memory to the PE array, while the drain unit extracts the final OF (output feature map) points from the individual PEs, post processes the OF points, and often compresses the OF points before writing the results back to the memory.

Within the PE array, the main computational unit in each PE is the multiply-and-accumulate (MAC) block that sources its input operands from local IF (input feature map) and FL (filter) register files (RFs) and writes the final MAC output to the OF (output feature map) register files (RFs). In a typical channel major DNN accelerator, the MAC unit in each PE accumulates over input channels (ICs). In this mode, all or a portion of the total input channels are fed sequentially one after another from local activation and weight register files of PEs. In this mode of operation, the IF and FL RFs store data sequentially in the input channel dimension so that the MAC unit within each PE can be fed with these values one after another, that are then multiplied and accumulated over time and eventually stored in the OF RFs.

The PEs can also work at lower precisions. For lower precisions, each 8 integer byte operand within the RFs can be assumed to represent either a single input channel (IC) or multiple input channel (ICs) of bit-width 4, 2, and 1. For input channel bit-widths 1, 2, 4, and 8, each byte represents 8, 4, 2, and 1 ICs, respectively. For lower precision operations, an input channel is always split into multiple smaller precision input channels so that the input channel can be accumulated with the help of multiple MAC operations.

Within the PE, the sparsity acceleration logic (e.g., find-first sparsity) works with compressed data (zero-value compressed). The zero and non-zero positions in the activation and weight data are represented by bits 0 and 1, respectively, in the bitmap in the compressed mode. The non-zero values are compressed and kept adjacent to each other in the IF and FL RFs. The bitmaps show in a practical sense where the non-zero and zero values occur in the uncompressed/dense vector. Because zero IF and FL values do not contribute to the overall MAC result, these inputs can be skipped without any impact on the output accuracy. Sparsity acceleration is obtained by skipping all IF and FL pairs for which either IF or FL or both values are zero. This is accomplished by combining the sparsity of IF and FL data through an AND operation of the IF and FL sparsity bitmaps. The total number of is in the combined bitmap depicts the total number of IF and FL pairs that result in non-zero partial sums that must be accumulated by the MAC over time. All other IF and FL pairs can be skipped for computation. For each load and compute round, the PE is only active during the duration for which the PE calculates the non-zero partial sums. Therefore, each PE is active proportional to the number of non-zero values the PE must produce, which in turn is proportional to the number of is in the combined sparsity bitmap.

The performance of a DNN accelerator is directly proportional to the sparsity in the data. An increase in sparsity also leads to a decrease in energy consumption, as the accelerator is active for less time for performing the same amount of work. In this type of DNN accelerator, the bias addition in operation 105 usually takes place in the post processing unit (PPE) that is part of the drain path logic of the DNN accelerator. The negative bias offset value added in operation 105 is adjusted to the bias value. The negative bias offset value added in operation 105 can be programmed as part of configuration registers within the PPE before layer execution begins. The values generated by operation 105 then go through sparsity encoding that are responsible for the creation of the sparsity bitmaps. The negative bias offset value added in operation 105 causes the ReLU operation 106 to generate a greater number of zeros, which causes higher sparsity acceleration and reduced energy consumption.

Figure 13:
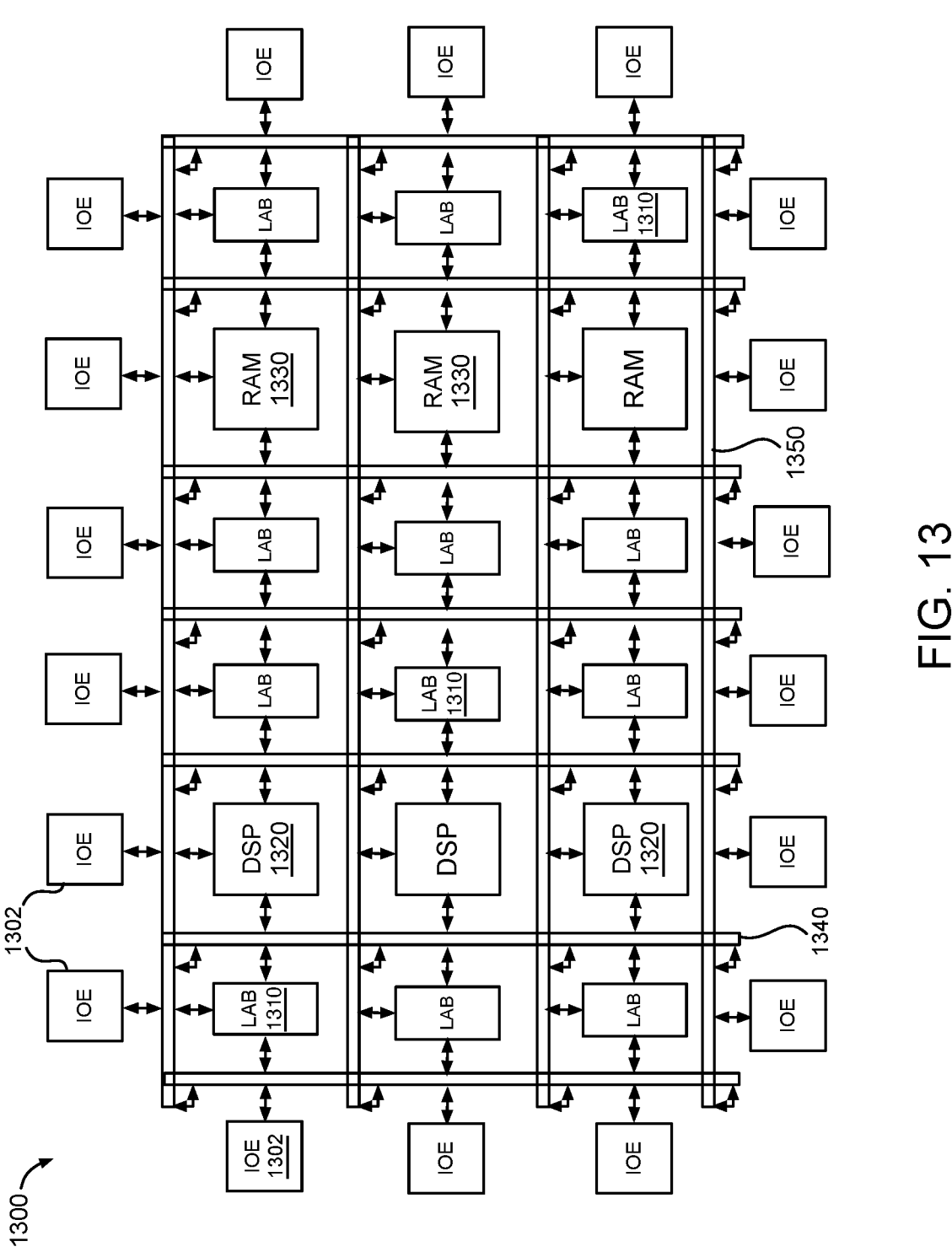
FIG. 13 is a diagram of an illustrative example of a programmable integrated circuit (IC) that can be configured to implement the ANNs, including the processing elements, discussed above.

FIG. 13 is a diagram of an illustrative example of a programmable integrated circuit (IC) 1300 that can be configured to implement the ANNs, including the processing elements, discussed above. As shown in FIG. 13, the programmable integrated circuit 1300 may include a two-dimensional array of functional blocks, including logic array blocks (LABs) 1310 and other functional blocks, such as random access memory (RAM) blocks 1330 and digital signal processing (DSP) blocks 1320, for example. Functional blocks, such as LABs 1310, may include smaller programmable regions (e.g., logic elements, configurable logic blocks, or adaptive logic modules) that receive input signals and perform custom functions on the input signals to produce output signals. One or more of the LABs 1310 and/or DSPs 1320 can implement the processing elements discussed above.

In addition, the programmable integrated circuit 1300 may have input/output elements (IOEs) 1302 for driving signals off of programmable integrated circuit 1300 and for receiving signals from other devices. Input/output elements 1302 may include parallel input/output circuitry, serial data transceiver circuitry, differential receiver and transmitter circuitry, or other circuitry used to connect one integrated circuit to another integrated circuit. As shown, input/output elements 1302 may be located around the periphery of the IC. If desired, the programmable integrated circuit 1300 may have input/output elements 1302 arranged in different ways. For example, input/output elements 1302 may form one or more columns of input/output elements that may be located anywhere on the programmable integrated circuit 1300 (e.g., distributed evenly across the width of the programmable integrated circuit). If desired, input/output elements 1302 may form one or more rows of input/output elements (e.g., distributed across the height of the programmable integrated circuit). Alternatively, input/output elements 1302 may form islands of input/output elements that may be distributed over the surface of the programmable integrated circuit 1300 or clustered in selected areas.

The programmable integrated circuit 1300 may also include programmable interconnect circuitry in the form of vertical routing channels 1340 (i.e., interconnects formed along a vertical axis of programmable integrated circuit 1300) and horizontal routing channels 1350 (i.e., interconnects formed along a horizontal axis of programmable integrated circuit 1300), each routing channel including at least one track to route at least one wire.

Note that other routing topologies, besides the topology of the interconnect circuitry depicted in FIG. 13, may be used. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of programmable integrated circuit 1300, fractional global wires such as wires that span part of programmable integrated circuit 1300, staggered wires of a particular length, smaller local wires, or any other suitable interconnection resource arrangement.

Furthermore, it should be understood that examples disclosed herein may be implemented in any type of integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Programmable integrated circuit 1300 may contain programmable memory elements. Memory elements may be loaded with configuration data (also called programming data) using input/output elements (IOEs) 1302. Once loaded, the memory elements each provide a corresponding static control signal that controls the operation of an associated functional block (e.g., LABs 1310, DSP 1320, RAM 1330, or input/output elements 1302).

In a typical scenario, the outputs of the loaded memory elements are applied to the gates of field-effect transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory or programmable memory elements.

The programmable memory elements may be organized in a configuration memory array consisting of rows and columns. A data register that spans across all columns and an address register that spans across all rows may receive configuration data. The configuration data may be shifted onto the data register. When the appropriate address register is asserted, the data register writes the configuration data to the configuration memory elements of the row that was designated by the address register.

Programmable integrated circuit 1300 may include configuration memory that is organized in sectors, whereby a sector may include the configuration RAM bits that specify the function and/or interconnections of the subcomponents and wires in or crossing that sector. Each sector may include separate data and address registers.

Figure 14:
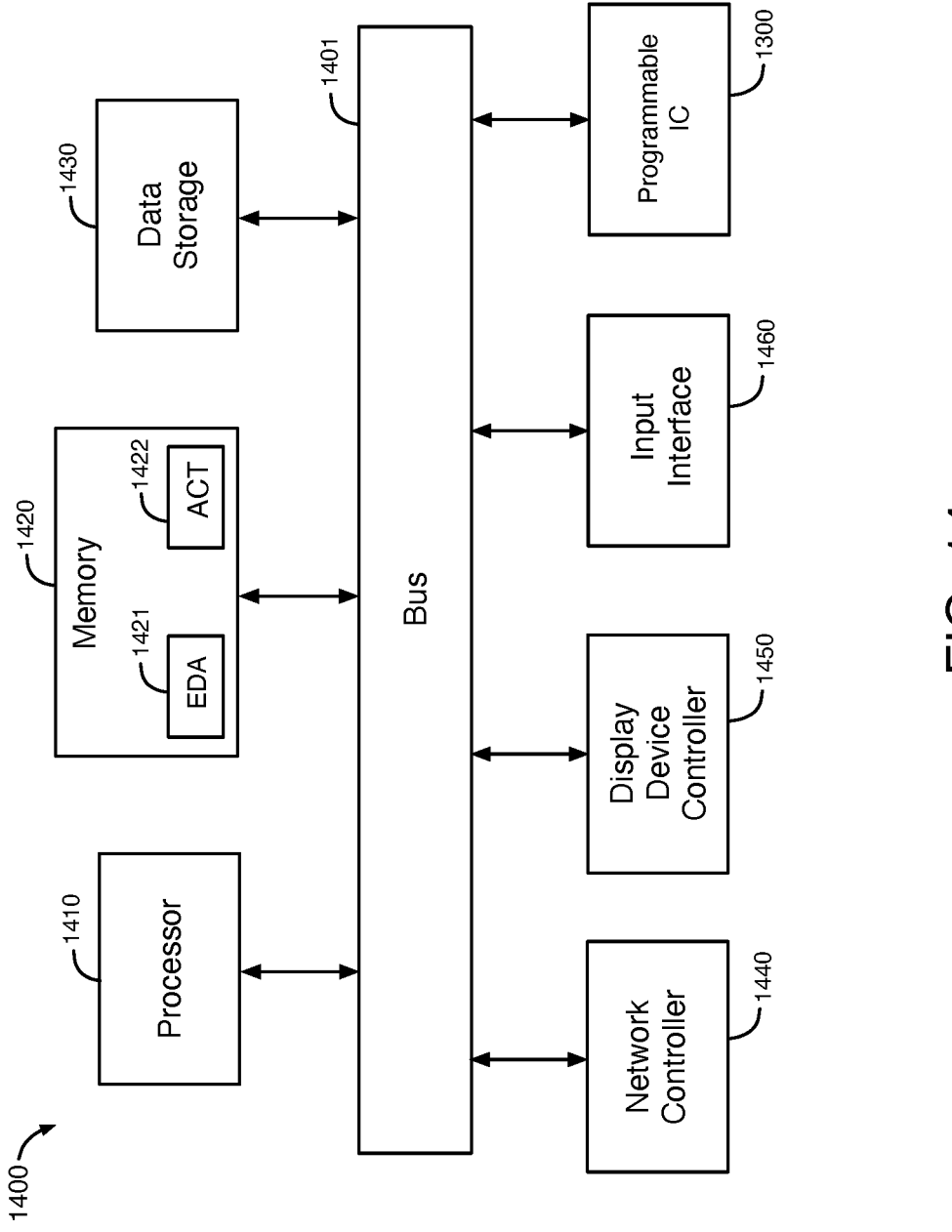
FIG. 14 illustrates a block diagram of a computing system that can implement any of the artificial neural networks disclosed herein.

FIG. 14 illustrates a block diagram of a computing system 1400 that can implement any of the artificial neural networks disclosed herein, or portions thereof. The computing system 1400 includes a processor 1410 (e.g., a microprocessor integrated circuit) that process data. The processor 1410 is coupled to a bus 1401 or other switch fabric that transmits data signals between processor 1410 and other components in the computing system 1400. The computing system 1400 includes a memory 1420. The memory 1420 can store instructions and code represented by data signals that can be executed by the processor 1410. A data storage device 1430 and programmable IC 1300 are also coupled to the bus 1401. Memory 1420 and data storage device 1430 are examples of non-transitory computer readable storage media.

A network controller 1440 is coupled to the bus 1401. The network controller 1440 can link the computing system 1400 to a network of computers (not shown) and supports communication among the computers. A display device controller 1450 is coupled to the bus 1401. The display device controller 1450 allows coupling of a display device (not shown) to the computing system 1400 and acts as an interface between the display device and the computing system 1400. An input interface 1460 is also coupled to the bus 1401. The input interface 1460 allows coupling of an input device (not shown) to the computing system 1400 and transmits data signals from the input device to the computing system 1400.

An electronic design automation (EDA) tool 1421 resides in the memory 1420 and can be executed by the processor 1410. The EDA tool 1421 operates to identify features of a neural network accelerator that includes characteristics and parameters of the accelerator, and resources of a target that the accelerator is to be implemented on. The EDA tool 1421 generates a design for the accelerator in response to the features of the accelerator and the resources of the target. The accelerator can implement any type of artificial neural network, such as a CNN or DNN. The target for implementing the neural network accelerator can be, for example, programmable integrated circuit 1300 or processor 1410. Processor 1410 and/or programmable IC 1300 can include the processing elements discussed above for implementing the neural network accelerator.

An accelerator configuration tool (ACT) 1422 also resides in memory 1420 and is executed by the processor 1410. The accelerator configuration tool 1422 identifies a machine learning algorithm to execute on an accelerator, identifies a variation of the accelerator that supports execution of the machine learning algorithm, and sets configurable status registers on a target to support the variation of the accelerator.

In general, software and data for performing any of the functions disclosed herein may be stored in non-transitory computer readable storage media. Non-transitory computer readable storage media is tangible computer readable storage media that stores data for later access, as opposed to media that only transmits propagating electrical signals (e.g., wires). The software code may sometimes be referred to as software, data, program instructions, instructions, or code. The non-transitory computer readable storage media may, for example, include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

One or more specific examples are described herein. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Additional examples are now described. Example 1 is a method for implementing an artificial neural network in a computing system, comprising: performing a compute operation using an input activation and a weight to generate an output activation; and modifying the output activation using a noise value to increase activation sparsity.

In Example 2, the method of Example 1 may optionally include, wherein modifying the output activation further comprises: adding or subtracting the noise value using the output activation.

In Example 3, the method of Example 1 may optionally include, wherein modifying the output activation further comprises: multiplying the noise value with the output activation.

In Example 4, the method of any one of Examples 1-3 may optionally include, wherein the noise value is generated by digital calculations.

In Example 5, the method of any one of Examples 1~4 may optionally include, wherein multiple input noise values are summed together to generate the noise value.

In Example 6, the method of any one of Examples 1-5 may optionally include, wherein modifying the output activation using the noise value further comprises: adding a bias value to the output activation to generate a bias adjusted function; and adding a noise tensor to the bias adjusted function to generate a probability density function of activations that increases the activation sparsity.

In Example 7, the method of any one of Examples 1-6 further comprises: generating the noise value using a linear feedback shift register.

In Example 8, the method of any one of Examples 1-7 further comprises: generating a Gaussian random variable for the noise value using a Box-Muller transform.

In Example 9, the method of any one of Examples 1-8 may optionally include, wherein the method is implemented by an accelerator on at least one programmable logic integrated circuit.

Example 10 is a non-transitory computer readable storage medium comprising instructions stored thereon for causing a computing system to execute a method for implementing an artificial neural network, wherein the instructions cause the computing system to: perform a computation using an input activation and a weight to generate an output activation; modify the output activation using a noise value to generate a post noise source function; and passing non-zero values for only a range of the post noise source function using an activation function.

In Example 11, the non-transitory computer readable storage medium of Example 10 may optionally include, wherein the activation function is a rectified linear activation function.

In Example 12, the non-transitory computer readable storage medium of any one of Examples 10-11 may optionally include, wherein the instructions further cause the computing system to: generate the noise value using a piecewise linear function.

In Example 13, the non-transitory computer readable storage medium of any one of Examples 10-12 may optionally include, wherein the instructions further cause the computing system to: generate the noise value using at least one linear feedback shift register.

In Example 14, the non-transitory computer readable storage medium of any one of Examples 10-13 may optionally include, wherein the instructions further cause the computing system to: generate the noise value with a central limit theorem that generates a cumulative distribution function that approximates a Gaussian distribution.

In Example 15, the non-transitory computer readable storage medium of any one of Examples 10-14 may optionally include, wherein the instructions further cause the computing system to: generate a Gaussian random variable for the noise value using a Box-Muller transform.

Example 16 is a computing system for implementing an artificial neural network, wherein the computing system comprises: one or more processing circuits configurable to perform a compute operation on an input activation and a weight to generate an output activation, wherein the one or more processing circuits are configurable to use the output activation to generate a function of activations comprising a larger number of negative activations compared to the output activation, and wherein the one or more processing circuits are configurable to perform a second operation on the function of activations to generate activations having increased activation sparsity caused by the larger number of negative activations.

In Example 17, the computing system of Example 16 may optionally include, wherein the one or more processing circuits are configurable to add a negative bias offset value to the output activation to generate the function of activations.

In Example 18, the computing system of any one of Examples 16-17 may optionally include, wherein the one or more processing circuits are configurable to perform a rectified linear activation function on the function of activations to generate the activations having increased activation sparsity caused by the larger number of negative activations.

In Example 19, the computing system of any one of Examples 16-18 may optionally include, wherein the one or more processing circuits are configurable to add a noise value to a function generated based on the output activation to generate the function of activations.

In Example 20, the computing system of any one of Examples 16-19 may optionally include, wherein the one or more processing circuits are implemented as one or more processing elements in one or more of a microprocessor integrated circuit, a programmable logic integrated circuit, or a graphics processing unit integrated circuit.

The foregoing description of the examples has been presented for the purpose of illustration. The foregoing description is not intended to be exhaustive or to be limiting to the examples disclosed herein. In some instances, features of the examples can be employed without a corresponding use of other features as set forth. Many modifications, substitutions, and variations are possible in light of the above teachings.

What is claimed is:

1. A method for implementing an artificial neural network in a computing system, comprising: performing a compute operation of a layer in the artificial neural network to generate output activations of the layer from input activations and weights of the layer, the artificial neural network comprising an activation function layer preceding the layer;

modifying the layer to increase activation sparsity, wherein modifying the layer comprises:

adding a first operation after the compute operation, and adding a second operation after the first operation, wherein the second operation is before the activation function layer;

performing the first operation by adding a bias value to the output activations to generate bias adjusted values; and performing the second operation to generate modified output activations, wherein performing the second operation comprises adding one or more noise values to the bias adjusted values to modify a probability density function of an input of the activation function layer, the input of the activation function layer comprising the modified output activations, wherein the modified output activations have increased sparsity than the output activations.

2. The method of claim 1, wherein the one or more noise values are generated by digital calculations.

3. The method of claim 1, wherein multiple input noise values are summed together to generate a noise value of the one or more noise values.

4. The method of claim 1 further comprising:

generating a noise value of the one or more noise values using a linear feedback shift register.

5. The method of claim 1 further comprising:

generating a Gaussian random variable for the one or more noise values using a Box-Muller transform.

6. The method of claim 1, wherein the method is implemented by an accelerator on at least one programmable logic integrated circuit.

7. A non-transitory computer readable storage medium storing instructions executable to perform operations for implementing an artificial neural network, to the operations comprising:

performing a compute operation of a layer in the artificial neural network to generate output activations of the layer from input activations and weights of the layer, the artificial neural network comprising an activation function layer preceding the layer;

modifying the layer to increase activation sparsity, wherein modifying the layer comprises:

adding a first operation after the compute operation, and adding a second operation after the first operation, wherein the second operation is before the activation function layer;

performing the first operation by adding a bias value to the output activations to generate bias adjusted values; and performing the second operation to generate modified output activations, wherein performing the second operation comprises adding one or more noise values to the bias adjusted values to modify a probability density function of an input of the activation function layer, the input of the activation function layer comprising the modified output activations, wherein the modified output activations have increased sparsity than the output activations.

8. The non-transitory computer readable storage medium of claim 7, wherein the activation function layer has a rectified linear activation function.

9. The non-transitory computer readable storage medium of claim 7, wherein the operations further comprise:

generating the one or more noise values using a piecewise linear function.

10. The non-transitory computer readable storage medium of claim 7, wherein the operations further comprise:

generating the one or more noise values using at least one linear feedback shift register.

11. The non-transitory computer readable storage medium of claim 7, wherein the operations further comprise:

generating the one or more noise values with a central limit theorem that generates a cumulative distribution function that approximates a Gaussian distribution.

12. The non-transitory computer readable storage medium of claim 7, wherein the operations further comprise:

generating a Gaussian random variable for the one or more noise values using a Box-Muller transform.

13. A computing system for implementing an artificial neural network, wherein the computing system comprises: a computer processor for executing computer program instructions; and a non-transitory computer-readable memory storing computer program instructions executable by the computer processor to:

perform a compute operation of a layer in the artificial neural network to generate output activations of the layer from input activations and weights of the layer, the artificial neural network comprising an activation function layer preceding the layer, modifying the layer to increase activation sparsity, wherein modifying the layer comprises:

adding a first operation after the compute operation, and adding a second operation after the first operation, wherein the second operation is before the activation function layer, performing the first operation by adding a bias value to the output activations to generate bias adjusted values, and performing the second operation to generate modified output activations, wherein performing the second operation comprises adding one or more noise values to the bias adjusted values to modify a probability density function of an input of the activation function layer, the input of the activation function layer comprising the modified output activations, wherein the modified output activations have increased activation sparsity than the output activations.

14. The computing system of claim 13, wherein the activation function layer has a rectified linear activation function.

15. The method of claim 1, wherein the activation function layer has a rectified linear unit operation, wherein the method further comprises performing the rectified linear unit operation on the modified output activations.

16. The method of claim 1, wherein the compute operation is a convolution operation.

17. The method of claim 1, wherein the input activations are in an input tensor of the layer, wherein the one or more noise values are in a noise tensor, the noise tensor having a same dimension as the input tensor.

18. The computing system of claim 13, wherein the compute operation is a convolution operation.

19. The computing system of claim 13, wherein the input activations are in an input tensor of the layer, wherein the one or more noise values are in a noise tensor, the noise tensor having a same dimension as the input tensor.

20. The computing system of claim 13, wherein the one or more noise values are generated using at least one linear feedback shift register.

* * * * *